United States Patent
McChesney et al.

[11] 3,934,743
[45] Jan. 27, 1976

[54] BLOW MOLDED, ORIENTED PLASTIC BOTTLE AND METHOD FOR MAKING SAME

[75] Inventors: Charles Edmund McChesney, Monmouth Junction; Robert J. McHenry, Belle Mead; James Alan Wachtel, Princeton, all of N.J.

[73] Assignee: American Can Company, Greenwich, Conn.

[22] Filed: Dec. 29, 1972

[21] Appl. No.: 319,380

[52] U.S. Cl. ............... 215/1 C; 64/17; 64/327; 428/35; 428/212; 428/910; 428/156; 428/409
[51] Int. Cl.² ............... B65D 23/00; B32B 7/02
[58] Field of Search ............ 161/166, 402; 215/1 C; 150/.5; 264/94, 97, 327, 99, 98; 428/35, 910, 212, 156, 409

[56] References Cited
UNITED STATES PATENTS

| | | | |
|---|---|---|---|
| 3,125,619 | 3/1964 | Miller | 264/98 |
| 3,141,912 | 7/1964 | Goldman | 264/94 |
| 3,191,225 | 6/1965 | Polka | 264/97 |
| 3,202,739 | 8/1965 | Zavasnik | 264/94 |
| 3,294,883 | 12/1966 | Polka | 264/97 |
| 3,426,102 | 2/1969 | Solak | 215/1 C |
| 3,594,862 | 7/1971 | Seefluth | 264/94 UX |
| 3,721,269 | 3/1973 | Choate | 161/402 X |
| 3,775,524 | 11/1973 | Seefluth | 264/327 |
| 3,786,221 | 1/1974 | Silverman | 264/94 |

Primary Examiner—George F. Lesmes
Assistant Examiner—Ellis P. Robinson
Attorney, Agent, or Firm—Robert P. Auber; Stanley L. Amberg; James W. Bock

[57] ABSTRACT

A molecularly oriented article having a tubular sidewall is blow-molded from a thermoplastic parison which is heat-treated prior to blowing to provide the parison sidewall with a temperature gradient wherein the temperature of the inside of the sidewall is greater than that of the outside, both of said temperature being within the orientation temperature range of the thermoplastic. The temperature gradient results in the sidewall of the article having a different and more uniform circumferential orientation release stress distribution radially across the sidewall than would be obtained if the parison were blown isothermally.

35 Claims, 3 Drawing Figures

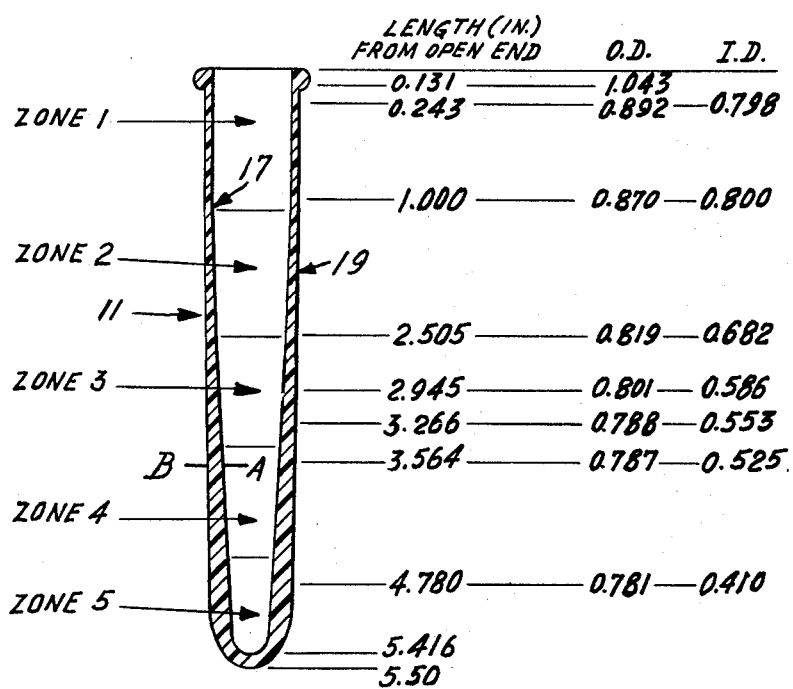
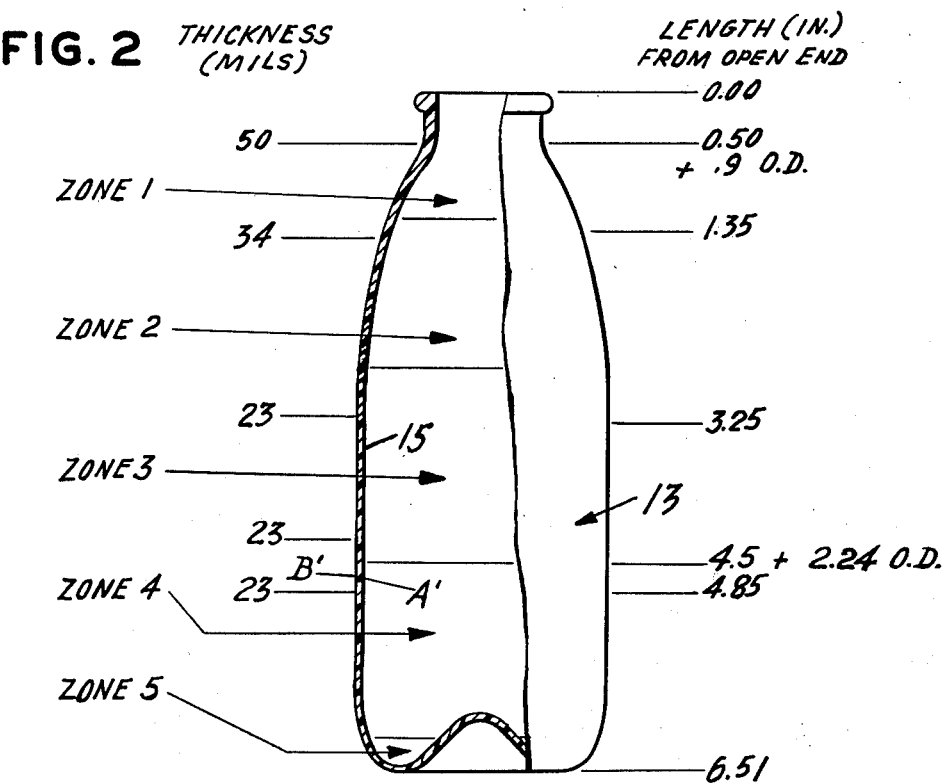

BLOW MOLDED, ORIENTED PLASTIC BOTTLE AND METHOD FOR MAKING SAME

BACKGROUND OF THE INVENTION

The subject invention relates to the manufacture of articles having sidewalls of oriented thermoplastic polymeric materials. More particularly, the invention relates to plastic bottles having in their sidewall a high level of circumferential orientation as measured by circumferential orientation release stress (ORS), as hereinafter defined, and to the manufacture of such bottles from closed-end tubes or parisons by blow-molding.

Molecular orientation of thermoplastic polymeric materials is not new. Molecularly oriented film and sheet are widely used and have improved physical properties, including superior impact resistance, increased resistance to creep, increased stiffness, increased resistance to stress rupture and reduced stress crazing, when compared to their unoriented counterparts. Examples of such materials are given in U.S. Pat. No. 3,141,912.

For a given polymer and end use application, there is an optimum level of orientation, which may be below the maximum possible orientation level. For example, impact strength may reach a maximum value as the amount of orientation is increased, with additional orientation resulting in a decreased impact strength. Another example of a property which may deteriorate with attempts to achieve high levels of orientation is optical transparency; certain polymers "stress whiten," giving them a milky appearance.

The amount of orientation in an article formed from a polymeric material is affected by the conditions under which the material is oriented. For example, in a tubular article higher levels of circumferential orientation result from increasing the amount of stretch in either the circumferential or axial direction, by increasing the stretching rate, and by decreasing the stretching temperature.

It has been proposed to form plastic bottles by blow-molding a parison, or closed-end tube. While such proposals have met with some success, it has not generally been economically practicable to form bottles for carbonated beverages by this technique. The reason has been that if the bottle is oriented, by stretching, sufficiently to develop the creep resistance required of containers for carbonated beverages (assuming a wall thickness thin enough to be economic), stress whitening has been observed to occur, making the container unsalable. Impact strength is also found to be undesirably low.

Further analysis of this phenomenon has brought the realization that stress whitening and reduced impact strength, which develop primarily at the inner portion of the bottle wall, is due to the fact that the inside of the parison is stretched to a much higher extent, proportionally, than the outside. It has been found that the degree of orientation is not constant across the bottle wall thickness, but on the contrary varies substantially across the wall, and at or near the inner portion of the wall is sufficiently high to give rise to the stress whitening and low impact strength.

SUMMARY OF THE INVENTION

In accordance with the present invention, these deficiencies are overcome in a self-supporting article, such as a bottle, having a tubular sidewall made of an oriented, polymeric, thermoplastic material and having inner, middle and outer portions, and characterized in that in an axial zone of said sidewall, the percentage variation of the circumferential orientation release stress (ORS), as defined below, or the percentage variation of the circumferential orientation as indicated by the ORS, from the inner portion to the outer portion is less than about 4 percent per mil of wall thickness, the percentage variation being determined by multiplying 100 by a fraction in which the numerator is the difference between the ORS at the inner and outer portions and the denominator is the average ORS of the inner, middle and outer portions multiplied by the radial distance between the centerlines of the inner and outer portions.

Articles according to the invention are also characterized in most instances in that the maximum circumferential orientation release stress, or the orientation as indicated by the ORS, in an axial zone of the sidewall along each line defined by the intersection of a plane normal to the axis of the tubular sidewall and a plane including said axis is less than about twice the minimum ORS, or orientation as indicated by the ORS, along that line. Further, the ORS, or orientation as indicated by the ORS, in the inner portion of the wall, along such a line is usually from about 75 to about 125 percent of the ORS, or orientation as indicated by the ORS, in the middle portion.

Further in accordance with the invention, an improvement is provided in methods for stretching articles which methods involve stretching one surface of the article to a proportionately greater extent than a second surface spaced apart from the first. The improvement comprises heat-treating the article to establish a temperature gradient between the surfaces such that the first surface is hotter than the second, both temperatures being within the molecular orientation range of the polymeric material involved, and stretching the article while maintaining that gradient.

Specifically, in connection with forming an article from a closed-end tube, the invention envisions heat-treating an axial zone of the tube to establish a temperature gradient across the thickness of the sidewall in the zone such that the inner surface is brought to a higher temperature than the outer surface, blow-molding the tube to form the article and maintaining the temperature of the inner surface greater than the temperature of the outer surface during at least a portion of said molding.

Preferably, in accordance with the invention, and particularly when the article is a bottle, the temperature gradient in the zone in Farenheit degrees is in the range from about
$$25([SR(i)/SR(o)] - 1)$$
to about
$$150([SR(i)/SR(o)] - 1),$$
and preferably is
$$75-125([SR(i)/SR(o)] - 1),$$
and most preferably is
$$100([SR(i)/SR(o)] - 1).$$

In the above formulae, SR(i) is the ratio of the inner diameter of the bottle in said zone to the inner diameter of that portion of the tube form which the zone was formed and SR(o) is the ratio of the outer diameter of the bottle in said zone to the corresponding outer diameter of the tube.

BRIEF DESCRIPTION OF THE DRAWINGS

FIG. 1 is a central vertical sectional view of an injection molded parison to be heat treated prior to blow-molding into a bottle.

FIG. 2 is a partial central vertical sectional view and partial elevational view of a bottle blow-molded from the parison of FIG. 1.

DESCRIPTION OF THE PREFERRED EMBODIMENT

Figure 3:
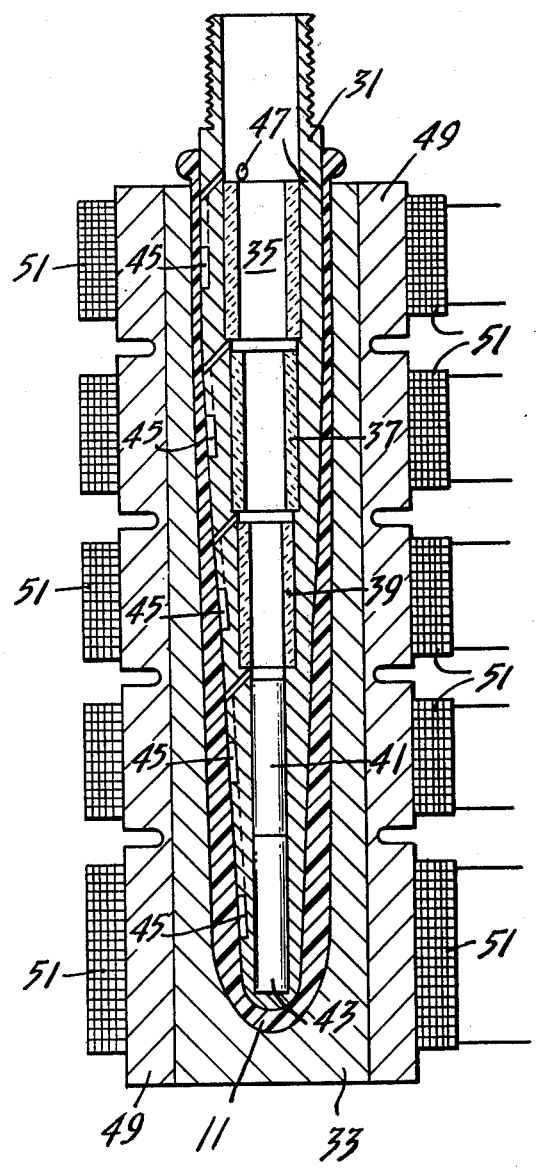
FIG. 3 is a central, vertical, sectional view of an electrical, contact heating apparatus for establishing a temperature gradient in the parison of FIG. 1 prior to blow-molding.

The present invention is preferably utilized in the production of a molecularly oriented bottle by blow-molding from a thermoplastic parison. It has been found that the temperature gradient to be established in the parison in order to produce a more uniformly oriented blow bottle is affected by the relative amounts of stretch of the inner and outer surfaces of the parison in the blowing operation, by the stretching rate and by the average temperature of thermoplastic material during the blowing operation. The temperature gradient is greater for a larger relative amount of stretch, a lower stretching rate and a higher blowing temperature.

The amount of stretch of the inner surface of the parison during the process of forming the parison into a blow-molded article may be expressed in terms of an "inside stretch ratio," $SR(i)$, which is the ratio of the inside diameter of the blown article at any given axial location to the inside diameter of that portion of the parison which was formed into the article at the axial location where the article's diameter was measured. The amount of stretch of the outer surface of the parison may similarly be expressed in terms of an "outside stretch ratio", $SR(o)$. In the case of a non-circular cross-sectional shape of the parison or the blown-article, the effective diameters may be used to obtain the respective stretch ratios.

The effect of the relative amounts of stretch of the inner and outer surfaces of the parison is illustrated by reference to the parison 11 shown in FIG. 1 and the bottle 13 blown therefrom as shown in FIG. 2. When parison 11 is blow-molded into bottle 13, the inside of the parison is stretched, for example, from a diameter of 0.525 inch at point A, 3.56 inches from the top of the parison, to become the inside of the bottle wall at point A′, 4.7 inches from the top of the bottle, at a diameter of 2.194 inches, with a resultant $SR(i)$ of 4.17. At the same time, the outside of parison 11 is stretched at point B from a diameter of 0.787 inch to a diameter of 2.24 inches at point B′ on the outside of bottle 13, with a resultant $SR(o)$ of 2.85. The extent to which $SR(i)$ is greater than $SR(o)$ is a measure of the relative amounts of stretch of the inner and outer surfaces of the parison.

If, during the blowing operation, there is a uniform temperature across the thickness of the sidewall of the parison, the inside portion of the blown article's sidewall will be substantially more highly oriented than the outside because, relative to the outside portion, the inside is stretched to a greater extent.

The parison is heat treated in accordance with the present invention to compensate for the relative difference in amounts of stretch of the parison sidewall from the inner to the outer portions thereof. Since less orientation occurs, for a given amount of stretch, at a higher stretching temperature, a temperature gradient is imparted to the parison sidewall prior to the blowing operation, with the temperature of the inner surface being greater than that of the outer surface.

It has been found that, in order to produce a blown bottle in which the maximum circumferential ORS at any axial location in the bottle sidewall is less than about twice the minimum ORS at that location, the temperature gradient across the parison sidewall in Farenheit degrees at the corresponding axial location in the parison, should be from about:

$25([SR(i)/SR(o)] - 1)$ to about:

$150([SR(i)/SR(o)] - 1)$

A preferred range of the temperature gradient in Farenheit degrees is from about:

$75([SR(i)/SR(o)] - 1)$ to about:

$125([SR(i)/SR(o)] - 1)$

For the parison and bottle of the type illustrated in FIGS. 1 and 2, the most preferred temperature gradient, in Farenheit degrees, in an axial zone of the parison is determined according to the formula: $100([SR(i)/SR(o)] - 1)$.

It has been found that when the maximum circumferential ORS, in an axial zone of the bottle sidewall and along each line defined by the intersection of a plane normal to the axis of the bottle and a plane including said axis, is less than about twice the minimum circumferential ORS along said line, the circumferential orientation of the polymeric material from which the bottle is formed is substantially more uniform, throughout the thickness of the sidewall, than the orientation obtained in a bottle that is blown from a parison in which there is an essentially isothermal temperature profile in the sidewall thereof. Preferably, for greater uniformity of orientation, the maximum ORS is less than about 1.5 times as large as the minimum ORS, and, in the most preferred case, the ORS is substantially uniform across the bottle's sidewall. The improved, more uniform, orientation distribution in the bottle's sidewall enables the optimum circumferential orientation to be achieved over a substantial portion of the sidewall's thickness.

The orientation release stress (ORS) of a polymeric material has been found to be a useful measure of the relative degree of molecular orientation of one portion of the thickness of an article's sidewall with respect to orientation of another portion.

For purposes of this specification, the orientation release stress is determined according to an adaptation of ASTM Test D 1504. In this method, bottles are first conditioned at 72° F (±5° F) at 50 percent relative humidity (±10 percent) for about 6 hours. The bottle specimens are prepared as follows:

The tops and bottoms of a given bottle are removed by cutting with a band saw. Annular rings of approximately ⅛ inch width and approximately 20 to 30 mils thick in Zone 4 (see FIG. 2) are cut off with a lathe in sequence from the resulting cylindrical section of the bottle wall. After the edges of each annulus are filed to remove flash material, the maximum and minimum thicknesses of each are measured in the region to be analyzed.

To obtain "inside" specimens which will provide information of the average circumferential direction orientation near the inner surface of the bottle wall, an annulus is slipped over a mandrel mounted on a lathe and material is removed from the outside surface in 2.5 mil steps, thereby resulting in an annulus thickness of about 10 mils. The lathe is operated at a lineal speed of 250 feet per minute at the cutting tool. The last few mils of material are always removed on a milling machine according to the procedure described below.

To obtain "outside" specimens from which the average circumferential direction orientation near the outer surface of the bottle wall can be determined, an annulus is slipped into a collet mounted on the lathe and the material is removed from the inside surface in 2.5 mil steps, to give an annulus thickness of about 10 mils. An additional few mils of material are then removed on a milling machine.

To obtain "middle" specimens which provide a measure of the average circumferential direction orientation midway through the thickness of the bottle sidewall, material is first removed from the inside of an annulus as set forth above to give a thickness of 15 to 20 mils. An almost equal amount of material is then removed from the outside of the annulus as set forth above to give "middle" specimens approximately 10 mils thick.

The final step in sample preparation is milling of the annuli to assure reasonably uniform cross-sections. This is accomplished by cutting each of these annuli so that the resulting three strips can be mounted via double-faced masking tape onto an aluminum block previously locked onto the table of the milling machine and "faced off" to assure parallel positioning of the samples to be milled. The milling operation is performed on the specimens by removing only about 1 mil of material per pass until 1 mil from the required 6 to 7 mil thickness, followed by ⅛ mil steps so that the desired thickness is achieved. The slowest machine cross head speed, 9/16 inch per minute, is used in conjunction with a two-fluted end mill ¾ inch in diameter, rotating at 1150 r.p.m. The three specimens are then stripped from the mounting plate, cut into minimum one inch lengths and the maximum and minimum thickness measured with a micrometer. These specimens are now ready for the actual measurement of ORS according to ASTM Test D 1504. In the modified procedure employed herein, samples are immersed in a 133° C. silicone oil bath.

The present invention is particularly applicable to the production of plastic bottles containing fluids under a high internal pressure, such as, for example, beer, carbonated beverages and aerosol container products. Such bottles require that the polymeric material from which the bottle is formed have a low permeability to gases such as carbon dioxide.

Suitable polymers for these purposes are prepared by polymerizing a major portion of an olefinically unsaturated nitrile, such as acrylonitrile, and a minor portion of an ester of an olefinically unsaturated carboxylic acid, such as ethyl acrylate, in the presence of a rubber containing a major proportion of a conjugated diene monomer, such as butadiene, and a minor proportion of olefinically unsaturated nitrile, such as acrylonitrile.

The conjugated diene monomers useful in the preparation of such polymers include 1,3-butadiene, isoprene, chloroprene, bromoprene, cyanoprene, 2,3-dimethyl-1,3-butadiene, 2-ethyl-1,3-butadiene, 2,3-diethyl-1,3-butadiene and the like.

The olefinically unsaturated nitriles useful in the preparation of such polymers are the alpha, beta-olefinically unsaturated mononitriles having the structure

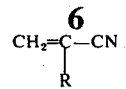

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like.

The esters of olefinically unsaturated carboxylic acid useful in the preparation of such polymers are preferably the lower alkyl esters of alpha, beta-olefinically unsaturated carboxylic acids and more preferred are the esters having the structure

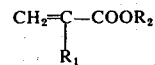

wherein $R_1$ is hydrogen, an alkyl group having from 1 to 4 carbon atoms, or a halogen and $R_2$ is an alkyl group having from 1 to 6 carbon atoms. Compounds of this type include methyl acrylate, ethyl acrylate, the propyl acrylates, the butyl acrylates, the pentyl acrylates, and the hexyl acrylates, methyl methacrylate, ethyl methacrylate, the propyl methacrylates, the butyl methacrylates, the pentyl methacrylates, and the hexyl methacrylates, methyl alphachloroacrylate, ethyl alpha-chloroacrylate and the like.

The more preferred polymers are derived from (A) about 60 to 90 parts by weight of an alpha, beta-olefinically unsaturated mononitrile having the structure $CH_2=C(-R_1)-CN$ where $-R_1$ is selected from the group consisting of hydrogen, halogen, and the lower alkyl groups, (B) about 40 to 10 parts by weight of an ester of an olefinically unsaturated carboxylic acid having the structure $CH_2=C(-R_1)-C(O)-O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 percent by weight of moieties derived from a conjugated diene monomer and about 40 to 20 percent by weight of moieties derived from a mononitrile having said $CH_2=C(-R_1)-CN$ structure.

The most preferred polymers are derived from about 60 to 90 parts by weight of acrylonitrile or methacrylonitrile and about 40 to 10 parts by weight of an ester selected from the group consisting of methyl acrylate, ethyl acrylate and methyl methacrylate, polymerized in the presence of about 1 to 20 additional parts by weight of a nitrile rubber containing about 60 to 80 percent by weight butadiene or isoprene moieties and about 40 to 20 percent by weight of acrylonitrile or methacrylonitrile moieties.

More specifically, the most preferred polymers are derived from about 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

Further examples of such polymers may be found in U.S. Pat. No. 3,426,102, the entirety of which is hereby incorporated into the instant specification by reference.

Preferred embodiments of the instant invention are described below, in the following examples, in conjunction with the parison and bottle illustrated in FIGS. 1 and 2 wherein the invention is utilized in heat treating a parison to be blow-molded into a bottle suitable for containing beer or a carbonated beverage.

EXAMPLE 1

Parison 11, shown in FIG. 1, to be blown into the bottle 13 having a sidewall 15, shown in FIG. 2, is formed by injection molding a thermoplastic polymer derived from 75 parts by weight acrylonitrile and 25 parts by weight methyl acrylate polymerized in the presence of 9 additional parts by weight of a nitrile rubber containing about 70 percent by weight 1,3-butadiene and about 30 percent by weight acrylonitrile. As is well known to the art, injection molding is a technique used to form a closed-end tube, commonly referred to as a "parison", having a particular material distribution, such as is shown in FIG. 1, but any other of the conventional parison forming techniques may be employed.

Parison 11 is then subjected to a heat treatment wherein a temperature gradient according to the present invention is established therein, whereby the temperature of its inner surface 17 is higher than that of its outer surface 19, both temperatures being within the molecular orientation temperature range of the polymer. During at least a portion of the blow-molding of parison 11 into bottle 13, the temperature of the inner surface of the parison is greater than that of its outer surface.

The contact heating apparatus of FIG. 3 which may be employed in heat-treating the parison 11 to form the temperature gradient comprises a metal blowing core pin 31 and in direct contact therewith lie three electrically-activated ceramic heaters 35, 37 and 39, and two electrically-activated metal cartridge heaters 41 and 43. Five thermistors 45, shown on the exterior of the core pin 31, are utilized to measure and control the temperature in each of the five core pin heating zones. Appropriate lead wires are employed for each thermistor and each heating unit in the core pin 31, which also include apertures 47 for releasing a high pressure fluid such as, for example, air in the subsequent blow-molding operation.

Surrounding the outer shell 33 is electrical insulation 49 around which are wrapped five band heaters 51. Electrical leads are shown leading from each of the band heaters to a source (not shown) of electrical power.

By suitably choosing the temperature of the core pin heating zone and the shell at any one or more of the five axial locations, the portion of the sidewall of parison 11 at each correlative zone can be given a predetermined radial temperature gradient. The temperature gradient may be the same in each of the zones, or it may vary from zone to zone, depending upon the variation, from one zone to another, of parison sidewall thickness, of the relative amount of stretch of the sidewall surfaces, of the stretching rate and of the average sidewall temperature.

For example, in the parison illustrated in FIG. 1, the sidewall temperature gradient varies from zone to zone. The outer surface temperature at the time when each zone begins to inflate is about: 180° F. in zone 1; 180° F. in zone 2; 175° F. in zone 3; 175° F. in zone 4; and 175° F. in zone 5. The inner surface temperature at that time, in each zone, is about: 190° F. in zone 1; 195° F. in zone 2; 205° F. in zone 3; 220° F. in zone 4; and 225° F. in zone 5.

The parison 11 is blow-molded with an increasing pressure which reaches about 250 p.s.i. in about 15 seconds to produce a bottle 13 whose sidewall 15 has a circumferential ORS varying between 1000 and 1500 p.s.i., the greater stress being on the inside.

The following examples illustrate that the use of a temperature gradient in the parison in accordance with the present invention is effective to give an ORS distribution in a bottle sidewall that is more uniform than when the same parison is blown isothermally into a bottle.

EXAMPLE 2

Parisons according to FIG. 1 were injection molded from the polymer described in Example 1 and were found to exhibit the following axial orientation release stress (ORS) distribution in Zone 4 prior to blowing:

|  | ORS |
|---|---|
| Inside of parison | 9 p.s.i. |
| Middle of parison | 0 p.s.i. |
| Outside of parison | 13 p.s.i. |

These parisons, which may be considered to be substantially unoriented, were then mounted on a blow-molding core pin with five, axial, heating zones and placed within a heating shell having five corresponding heating zones, as described above and as shown in FIG. 3 to heat treat the parison prior to blowing. Axial heating zone 1 extended from the open end of the parison to about 1.25 inches from that end, measured along the longitudinal axis of the parison; zone 2 extended from about 1.25 inches to about 2.3 inches from that end; zone 3 extended from about 2.3 inches to about 3.3 inches from that end; zone 4, from about 3.3 inches to about 4.3 inches from that end; and zone 5, from about 4.3 inches from the open end to the closed end of the parison.

The parisons of Group A were heat treated to produce a different radial temperature gradient in each heating zone. The parisons of Group B were heat treated to be isothermal in a radial direction in each zone.

Table I gives the zonal temperatures of the pin and shell employed to heat-treat the parisons. The temperature of the inner and outer surfaces of the parison immediately after the parisons left the heating shell were substantially as shown in Table I.

TABLE I

| Parison | | (Top) Zone 1 | Zone 2 | Zone 3 | Zone 4 | (Bottom) Zone 5 | Gradient in Zone 4 |
|---|---|---|---|---|---|---|---|
| A | 1 | 180/165 | 190/160 | 204/160 | 230/160 | 237/160 | 70F.° |
|   | 2 | 180/165 | 190/160 | 204/160 | 230/160 | 237/160 | 70F.° |
|   | 3 | 180/180 | 185/185 | 190/190 | 200/200 | 200/200 | — |
| B | 4 | 180/180 | 185/185 | 190/190 | 200/200 | 200/200 | — |
|   | 5 | 180/180 | 185/185 | 190/190 | 200/200 | 200/200 | — |

PIN TEMP./SHELL TEMP. (°F.)

The pin temperatures of Table I, in the respective zones, were measured at the distance from the open end of the parison and at the parison diameters and sidewall thicknesses stated in Table II; the shell temperatures of Table I were measured at the distances from the open end of the parison stated in Table II.

TABLE II

|        | Pin Temperature | Outer Diameter | Sidewall Thickness | Shell Temperature |
|--------|-----------------|----------------|--------------------|-------------------|
| Zone 1 | 0.5 inch        | 0.88 inch      | 0.045 inch         | 0.80 inch         |
| Zone 2 | 1.5 inches      | 0.86 inch      | 0.047 inch         | 1.8 inches        |
| Zone 3 | 2.5 inches      | 0.82 inch      | 0.072 inch         | 2.9 inch          |
| Zone 4 | 3.8 inches      | 0.78 inch      | 0.150 inch         | 4.0 inches        |
| Zone 5 | 4.9 inches      | 0.77 inch      | 0.194 inch         | 5.0 inches        |

These 5 parisons were then blown into the bottle of FIG. 2. The average sidewall thickness in zone 4 of the bottles blown from the parisons of Group A was 22 mils; the bottles blown from the Group B parisons had an average sidewall thickness of 27 mils in zone 4.

The parisons of Group A were blown into a polymethylmethacrylate mold with an increasing pressure which reached 140 p.s.i. in about 18 seconds; the parisons of Group B, were blown with an increasing pressure which reached 150 p.s.i. in about 20–25 seconds.

Inflation of each parison began approximately 6 seconds after the parison was removed from the heating shell and occurred at that part of zones 1 and 2 where the sidewall thickness was a minimum. Inflation began in zone 3 at about 9 seconds after removal from the heating shell; in zone 4, at about 11 seconds after removal; and in zone 5, at about 15.5 seconds removal. The inner surface of the portions of the parison corresponding to zones 1–4 remained in contact with the heating pin until inflation occurred. The surface portion in zone 5 broke contact at about 11 seconds after removal due to axial elongation occurring during inflation of zones 1–4.

The first row of Table III gives the inside and outside surface temperatures of the Group A parisons, at each axial zone thereof as determined at the locations stated in Table II, approximately six seconds after the parison was removed from the heating shell. The second row of Table III gives the corresponding temperatures at the respective times when inflation commenced in each zone.

TABLE IV

| Bottle From Parison Indicated | | Specimen | Inside | ORS (p.s.i.) Middle | Outside |
|---|---|---|---|---|---|
| A | 1 | a | 1078 | 1318 | 578 |
|   |   | b | 984  | 1246 | 689 |
|   | 2 | a | 951  | 1058 | 588 |
|   |   | b | 968  | 996  | 598 |
|   |   | Avg. | 995 | 1156 | 613 |
|   | 3 | a | 2293 | 1408 | 572 |
|   |   | b | 1941 | 1066 | 584 |
| B | 4 | a | 1616 | 707  | 365 |
|   |   | b | 1061 | 772  | 345 |
|   | 5 | a | 1342 | 1274 | 598 |
|   |   | b | 1387 | 1246 | 630 |
|   |   | Avg. | 1607 | 1079 | 516 |

As seen above, the bottles of Group A, which were blown from parisons having the radial temperature gradients of Table III, exhibited less variation in circumferential orientation across the sidewall in Zone 4 then did the isothermally blown bottles of Group B. In the case of the inside, middle and outside sidewall portions of the Group A (temperature gradient) bottles taken as a whole, the maximum circumferential orientation release stress (Zone 4) was no more than about twice as large as the smallest orientation release stress, whereas in the case of the bottles of Group B (isothermal), taken as a whole, the maximum orientation release stress (Zone 4) was greater than three times the minimum. A comparable reduction in the variation of orientation is effected in the other axial zones of the sidewall of the bottle.

Considering 7 mils to be the average thickness of each of the "inside," "middle" and "outside" portions of the bottle sidewall that were utilized to obtain the ORS data of Table IV, a "percentage full width ORS gradient" from the "inside" portion to the "outside" portion can be determined from the ORS data of Table IV by (1) subtracting the "outside" ORS from the "inside" ORS, by (2) dividing the difference by the product of (a) the radial distance from the center-line of the "inside" portion to the center-line of the "outside" portion times (b) the average of the "inside," "middle" and "outside" orientation release stresses, and (3) by miltiplying the quotient by one-hundred.

TABLE III

INSIDE/OUTSIDE TEMP. (°F.)

| Parison | Zone 1 | Zone 2 | Zone 3 | Zone 4 | Zone 5 | Gradient in Zone 4 |
|---------|--------|--------|--------|--------|--------|--------------------|
| A1 & A2 | 180/172 | 190/176 | 204/176 | 230/172 | 237/170 | 58F.° |
| A1 & A2 | 180/172 | 190/176 | 204/179 | 230/176 | 227/175 | 54F.° |

Orientation release stresses (ORS) for the "inside", "middle" and "outside" portions of the bottle sidewall at Zone 4 were as stated in Table IV.

The resultant "percentage full width ORS gradients," in percent per mil, are given in Table V, together with the respective center-line to center-line distance, in mils, for each specimen.

TABLE V

| Bottle From Parison | Specimen | Center-Line Distance | Percentage ORS Gradient |
|---|---|---|---|
| A1 | a | 16.4 | 3.08 |
|  | b | 16.3 | 1.86 |
| A2 | a | 15.2 | 2.76 |
|  | b | 15.25 | 2.84 |
| Average |  |  | 2.64 |
| B3 | a | 19.9 | 6.07 |
|  | b | 19.9 | 5.70 |
| B4 | a | 21.7 | 6.43 |
|  | b | 21.75 | 4.53 |
| B5 | a | 20.7 | 3.35 |
|  | b | 20.8 | 3.35 |
| Average |  |  | 4.91 |

These parisons are then heat-treated similarly to the parisons of Group A to produce radial temperature gradients in the sidewalls thereof in accordance with the present invention.

Table VI gives the zonal temperatures of the pin and shell employed to heat-treat the parisons. The temperatures were measured at the locations stated above in Table II, and the parison dimensions were as stated therein.

TABLE VI

| | PIN TEMP./SHELL TEMP. (°F.) | | | | | |
|---|---|---|---|---|---|---|
| Parison | Zone 1 | Zone 2 | Zone 3 | Zone 4 | Zone 5 | Gradient Zone 4 |
| 6 | 200/162 | 200/157 | 205/157 | 212/163 | 210/158 | 49F.° |
| 7 | 207/167 | 204/162 | 217/161 | 218/168 | —/165 | 50F.° |
| 8 | 196/167 | 193/163 | 206/162 | 222/170 | —/167 | 52F.° |
| 9 | 196/167 | 193/163 | 206/162 | 222/170 | —/167 | 52F.° |

The data of Table V illustrate that the bottles of Group A, blown from parisons that were heat-treated to have a radial temperature gradient in accordance with the present invention, have a substantially greater uniformity of circumferential orientation in their sidewalls than do the bottles of Group B, blown from radially isothermal parisons.

Bottles made from parisons having the temperature gradient of the present invention have in their sidewalls a "percentage full width ORS gradient" of less than about 4 percent per mil of sidewall thickness, and preferably less than about 3 percent per mil.

In the above examples, the parisons were substantially unoriented in the axial and circumferential directions prior to being heated for the blowing operation. Depending upon the process used to form it, the parison may itself have a given amount of axial of such orientation upon the ORS distribution in the bottle sidewall is illustrated in the following example.

EXAMPLE 3

The parisons of FIG. 1 are injection molded from the same polymer set forth above and their sidewalls in Zone 4 exhibit the following orientation release stress (p.s.i.):

| Parison | Inside | Middle | Outside |
|---|---|---|---|
| 6 | 61 | 0 | 36 |
| 7 | 61 | 0 | 36 |
| 8 | 89 | 0 | 43 |
| 9 | 89 | 0 | 43 |

These four parisons were then blown into the bottle of FIG. 2 with an increasing pressure that reached 180 p.s.i. in about 20 seconds. The average sidewall thickness in zone 4 of the bottles was 22 mils.

The chronology of the sequential, axial inflation and the residence times on the heating pin of the zonal portions of the parison after removal of the heating shell were the same as in Example 2.

The first three rows of Table VII give the inside and outside surface temperatures of parisons 6–9, at each axial zone thereof as determined at the locations stated in Table II, approximately 6 seconds after the parison was removed from the heating shell. The second three rows of Table VII give the corresponding temperatures at the respective times when inflation commenced in each zone.

TABLE VII

| | INSIDE/OUTSIDE TEMP. (°F.) | | | | | |
|---|---|---|---|---|---|---|
| Parison | Zone 1 | Zone 2 | Zone 3 | Zone 4 | Zone 5 | Gradient in Zone 4 |
| 6 | 200/182 | 200/183 | 205/174 | 212/171 | 210/164 | 41F.° |
| 7 | 207/189 | 204/185 | 217/181 | 218/175 | 220/173 | 43F.° |
| 8 & 9 | 196/183 | 193/179 | 206/176 | 222/178 | 220/173 | 44F.° |
| 6 | 200/185 | 200/183 | 205/178 | 212/173 | 203/167 | 39F.° |
| 7 | 207/189 | 204/185 | 217/185 | 218/177 | 213/176 | 41F.° |
| 8 & 9 | 196/183 | 193/179 | 206/186 | 222/180 | 213/176 | 42F.° |

Orientation release stresses (p.s.i.) for the "inside," "middle" and "outside" portions of the bottle sidewall at Zone 4 were as stated in Table VIII.

TABLE VIII

| Bottle From Parison | Specimen | ORS (p.s.i.) | | |
|---|---|---|---|---|
| | | Inside | Middle | Outside |
| 6 | a | 1207 | 1278 | 808 |
|  | b | 1015 | 1072 | 690 |
| 7 | a | 936 | 1061 | 545 |
|  | b | 1255 | 1144 | 570 |
| 8 | a | 890 | 1127 | 598 |
|  | b | 1077 | 1132 | 595 |
| 9 | a | 876 | 973 | 531 |
|  | b | 1015 | 1049 | 584 |
| | Avg. | 1034 | 1105 | 615 |

From the data of Table VIII, taken as a whole, for bottles from parisons 6–9, it can be seen that with respect to the "inside", "middle" and "outside" portions of the bottles' sidewalls, the maximum circumferential orientation release stress was no more than about twice as large as the smallest orientation release stress therein.

From the data of Table VIII, the "percentage full width ORS gradient" for each specimen can be determined in the same manner as in Example 2. The resultant gradients, in percent per mil, are presented in Table IX, together with the respective center-line to center-line distance, in mils, for each specimen.

TABLE IX

| Bottle From Parison | Specimen | Center-Line Distance | Percentage ORS Gradient |
|---|---|---|---|
| 6 | a | 15.0 | 2.42 |
|   | b | 14.2 | 2.47 |
| 7 | a | 15.1 | 3.06 |
|   | b | 15.2 | 2.47 |
| 8 | a | 15.2 | 2.20 |
|   | b | 15.4 | 3.35 |
| 9 | a | 15.0 | 2.91 |
|   | b | 15.0 | 3.26 |
| Average |  |  | 3.03 |

The data of Table IX illustrate that parisons which themselves possess a given amount of axial orientation in the sidewall prior to blowing may be heat-treated in accordance with the present invention to impart a temperature gradient to the sidewall thereof whereby the sidewalls of the bottles blown therefrom have substantially the same full width ORS gradient as to bottles made from essentially unoriented parisons.

Blow-molded articles made from parisons heat-treated according to the present invention have a substantially more uniform circumferential orientation from the inner to the middle portions of the sidewall thereof than do articles made from radially isothermal parisons. In an axial zone of the sidewall, the circumferential ORS in the inner portion of the sidewall is between about 75 and about 125 percent of the ORS in the middle portion thereof, and, preferably, is between about 90 and 110 percent of the ORS in said middle portion.

The instant invention is applicable for any bottle sidewall thickness, but is especially useful for thicknesses between 5 and 60 mils, and particularly between 15 and 35 mils. The invention is also applicable for any parison which at its thickest part, exclusive of closure finish, is between 100 and 300 mils thick.

Bottles blow-molded by the method of this invention can be produced from any glassy, essentially non-crystalline, thermoplastics which can be biaxially oriented. Examples of such materials are polyvinyl chloride, polystyrene, acrylonitrile copolymers and methacrylonitrile copolymers.

The molecular orientation temperature range of an essentially non-crystalline thermoplastic polymer useful in the practice of the present invention is that temperature range above the glass transition temperature, and below the softening temperature, in which the polymer is rubbery or leathery. The highest degree of molecular orientation is obtained by stretching the polymer when it is in the leathery state, viz. where its behavior is retarded, highly elastic, which is evidenced when the polymer is subjected to a stress and undergoes a small, instantaneous strain and then a much larger strain over a relatively long period of time. The orientation temperature range of the polymer described in Example 1 is from about 170°F. to about 275°F.

It is thought that the invention and many of its attendant advantages will be understood from the foregoing description; and it will be apparent that various changes may be made in the form, construction and arrangement of the parts of the article and that changes may be made in the steps of the method described and their order of accomplishment without departing from the spirit and scope of the invention or sacrificing its material advantages.

We claim:

1. A self-supporting biaxially oriented plastic container blow molded from a parison across the thickness of its sidewall an outwardly radially decreasing temperature gradient within the orientation temperature range of and made from a glassy, essentially non-crystalline thermoplastic polymeric material which is capable of being biaxially oriented during blow molding, said container having a tubular sidewall with inner and outer surfaces, said sidewall having inner, middle and outer portions and being characterized in that in an axial zone thereof the percentage variation of the circumferential orientation release stress from said inner portion to said outer portion is less than about 4% per mil of sidewall thickness, said percentage variation being determined by multiplying 100 by a fraction in which the numerator is the difference between the orientation release stresses at said inner and outer portions and in which the denominator is the average of the orientation release stresses in said inner, middle and outer portions multiplied by the radial distance in mils between the centerlines of the inner and outer portions.

2. A container according to claim 1 wherein the tubular sidewall has a circumferentially directed orientation, said sidewall being characterized in that the maximum circumferential orientation release stress in an axial zone of said sidewall along each line defined by the intersection of a plane normal to the axis of said tubular sidewall and a plane including said axis, is less than about twice the minimum circumferential orientation release stress along said line.

3. A container according to claim 1 wherein the tubular sidewall has a circumferentially directed orientation, said sidewall being characterized in that in an axial zone thereof the maximum circumferential orientation, as measured by the orientation release stress, in said sidewall along each line defined by the intersection of a plane normal to the axis of said sidewall and a plane including said axis is less than about twice the minimum orientation along said line, as measured by the orientation release stress.

4. A container according to claim 1 wherein the tubular sidewall is characterized in that, in an axial zone of said sidewall and along each line defined by the intersection of a plane normal to the axis of said sidewall and a plane including said axis, the orientation release stress in the inner portion is from about 75 percent to about 125 percent of the orientation release stress in said middle portion.

5. A container according to claim 1 wherein the tubular sidewall is characterized in that, in an axial zone in said sidewall and along each line defined by the intersection of a plane normal to the axis of said tubular sidewall and a plane including said axis, the orientation, as measured by the orientation release stress, in the inner portion is from about 75 percent to about 125 percent of the orientation, as measured by the orientation release stress, in said middle portion.

6. The blow molded oriented plastic container claimed in claim 1 wherein said percentage variation is less than about 3 percent per mil.

7. The blow molded oriented plastic container claimed in claim 6 wherein said container is a bottle.

8. The blow molded oriented plastic container claimed in claim 1 wherein said container is a bottle, said percentage variation is less than about 3 percent per mil, and wherein said polymeric material is prepared by polymerizing a major portion of an olefinically unsaturated nitrile and a minor portion of an ester of a polymerizable olefinically unsaturated carboxylic acid in the presence of a preformed rubbery copolymer composed of a major proportion of a conjugated diene monomer and a minor proportion of an olefinically unsaturated nitrile.

9. The blow molded oriented plastic container claimed in claim 1 wherein said container is a bottle, said percentage variation is less than about 3 percent per mil, and wherein said polymeric material is derived from (A) about 60 to 90 parts by weight of an alpha, beta-olefinically unsaturated mononitrile having the structure $CH_2=C(-R_1)-CN$ where $-R_1$ is selected from the group consisting of hydrogen, halogen, and lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 percent by weight of moieties derived from a conjugated diene monomer and about 40 to 20 percent by weight of moieties derived from a mononitrile having said $CH_2=C(-R_1)-CN$ structure.

10. The blow molded oriented plastic container claimed in claim 1 wherein said container is a bottle, said percentage variation is less than about 3 percent per mil, and wherein said polymeric material is derived from 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

11. The blow molded oriented plastic container claimed in claim 2 wherein said container is a bottle.

12. The blow molded oriented plastic container claimed in claim 11 wherein said polymeric material is prepared by polymerizing a major portion of an olefinically unsaturated nitrile and a minor portion of an ester of a polymerisable olefinically unsaturated carboxylic acid in the presence of a preformed rubbery copolymer composed of a major proportion of a conjugated diene monomer and a minor proportion of an olefinically unsaturated nitrile.

13. The blow molded oriented plastic container claimed in claim 11 wherein said polymeric material is derived from (A) about 60 to 90 parts by weight of an alpha,beta-olefinically unsaturated mononitrile having the structure $CH_2=C(-R_1)-CN$ where $-R_1$ is selected from the group consisting of hydrogen, halogen, and lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 percent by weight of moieties derived from a conjugated diene monomer and about 40 to 20 percent by weight of moieties derived from a mononitrile having said $CH_2=C(-R_1)-CN$ structure.

14. The blow molded oriented plastic container claimed in claim 11 wherein said polymeric material is derived from 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

15. The blow molded oriented plastic container claimed in claim 14 wherein said maximum circumferential orientation release stress is less than about 1.5 times said minimum circumferential orientation release stress.

16. The blow molded oriented plastic container claimed in claim 4 wherein said container is a bottle.

17. The blow molded oriented plastic container claimed in claim 16 wherein said polymeric material is prepared by polymerizing a major portion of an olefinically unsaturated nitrile and a minor portion of an ester of a polymerizable olefinically unsaturated carboxylic acid in the presence of a preformed rubbery copolymer composed of a major proportion of a conjugated diene monomer and a minor proportion of an olefinically unsaturated nitrile.

18. The blow molded oriented plastic container claimed in claim 16 wherein said polymeric material is derived from (A) about 60 to 90 parts by weight of an alpha,beta-olefinically unsaturated mononitrile having the structure $CH_2=C(-R_1)-CN$ where $-R_1$ is selected from the group consisting of hydrogen, halogen, and lower alkyl groups, (B) about 40 to 10 parts by weight of an ester of an olefinically unsaturated carboxylic acid having the structure $CH_2=C(-R_1)-C(O)O-R_2$ where $-R_1$ is as defined above and $-R_2$ is an alkyl group having from 1 to 6 carbon atoms, (A) and (B) together comprising 100 parts by weight, polymerized in the presence of (C) about 1 to 20 parts by weight of a nitrile rubber containing about 60 to 80 percent by weight of moieties derived from a conjugated diene monomer and about 40 to 20 percent by weight of moieties derived from a mononitrile having said $CH_2=C(-R_1)-CN$ structure.

19. The blow molded oriented plastic container claimed in claim 16 wherein said polymeric material is derived from 73 to 77 parts by weight acrylonitrile and 27 to 23 parts by weight methyl acrylate, polymerized in the presence of 8 to 10 additional parts by weight of a nitrile rubber containing about 70 percent by weight butadiene moieties and about 30 percent by weight acrylonitrile moieties.

20. The blow molded oriented plastic container claimed in claim 19 wherein said orientation release stress in said inner portion is from about 90 percent to about 110 percent of said orientation release stress in said middle portion.

21. The blow molded oriented plastic container claimed in claim 1 wherein said average of the orientation release stresses in said inner, middle and outer portions is in the range from about 800 p.s.i. to about 1,000 p.s.i.

22. The blow molded oriented plastic container claimed in claim 6 wherein said average of the orientation release stresses in said inner, middle and outer portions is in the range from about 800 p.s.i. to about 1,000 p.s.i.

23. The blow molded oriented plastic container claimed in claim 7 wherein said average of the orientation release stresses in said inner, middle and outer portions is in the range from about 800 p.s.i. to about 1,000 p.s.i.

24. The blow molded oriented plastic container claimed in claim 10 wherein said average of the orientation release stresses in said inner, middle and outer portions is in the range from about 800 p.s.i. to about 1,000 p.s.i.

25. The blow molded oriented plastic container claimed in claim 2 wherein said sidewall has inner, middle and outer portions and wherein said average of the orientation release stresses in said inner, middle and outer portions is in the range from about 800 p.s.i. to about 1,000 p.s.i.

26. The blow molded oriented plastic container calimed in claim 14 wherein said sidewall has inner, middle and outer portions and wherein said average of the orientation release stresses in said inner, middle and outer portions is in the range from about 800 p.s.i. to about 1,000 p.s.i.

27. The blow molded oriented plastic container claimed in claim 15 wherein said sidewall has inner, middle and outer portions and wherein said average of the orientation release stresses in said inner, middle and outer portions is in the range from about 800 p.s.i. to about 1,000 p.s.i.

28. The blow molded oriented plastic container claimed in claim 4 wherein said average of the orientation release stresses in said inner, middle and outer portions is in the range from about 800 p.s.i. to about 1,000 p.s.i.

29. The blow molded oriented plastic container claimed in calim 16 wherein said average of the orientation release stresses in said inner, middle and outer portions is in the range from about 800 p.s.i. to about 1,000 p.s.i.

30. The blow molded oriented plastic container claimed in claim 19 wherein said average of the orientation release stresses in said inner, middle and outer portions is in the range from about 800 p.s.i. to about 1,000 p.s.i.

31. The blow molded oriented plastic container claimed in claim 1 wherein said sidewall is further characterized in that the maximum circumferential orientation release stress in an axial zone of said sidewall along each line defined by the intersection of a plane normal to the axis of said tubular sidewall and a plane including said axis, is less than about twice the minimum circumferential orientation release stress along said line.

32. The blow molded oriented plastic container claimed in claim 31 wherein said sidewall is further characterized in that, in an axial zone of said sidewall and along each line defined by the intersection of a plane normal to the axis of said sidewall and a plane including said axis, the orientation release stress in the inner portion is from about 75 percent to about 125 percent of the orientation release stress in said middle portion.

33. The blow molded oriented plastic container claimed in claim 1 wherein said container is a bottle, and wherein said sidewall is further characterized in that the maximum circumferential orientation release stress in an axial zone of said sidewall along each line defined by the intersection of a plane normal to the axis of said tubular sidewall and a plane including said axis, is less than about twice the minimum circumferential orientation release stress along said line.

34. The blow molded oriented plastic container claimed in claim 33 wherein said sidewall is further characterized in that, in an axial zone of said sidewall and along each line defined by the intersection of a plane normal to the axis of said sidewall and a plane including said axis, the orientation release stress in the inner portion is from about 75 percent to about 125 percent of the orientation release stress in said middle portion.

35. The blow molded oriented plastic container claimed in claim 1 wherein said container is a bottle.

* * * * *

UNITED STATES PATENT OFFICE
CERTIFICATE OF CORRECTION

PATENT NO. : 3,934,743
DATED : January 27, 1976
INVENTOR(S) : Charles Edmund McChesney, Robert J. McHenry and James Alan Wachtel.

It is certified that error appears in the above-identified patent and that said Letters Patent are hereby corrected as shown below:

Col. 11, line 62, after "following" insert --axial--

Claim 1, line 16, after "parison" insert --having--

Claim 9, line 38, the formula after "said" should be: $--CH_2=C(-R_1)-CN--$

Claim 12, line 56, change "polymerisable" to --polymerizable--

Signed and Sealed this

Twenty-first Day of December 1976

[SEAL]

Attest:

RUTH C. MASON
*Attesting Officer*

C. MARSHALL DANN
*Commissioner of Patents and Trademarks*